United States Patent [19]

Bachot et al.

[11] Patent Number: 5,584,977
[45] Date of Patent: Dec. 17, 1996

[54] ASBESTOS-FREE CATHODES FOR ELECTROLYTIC CELLS

[75] Inventors: Jean Bachot, La Reine; Frédéric Kuntzburger, Le Plessis Bouchard, both of France

[73] Assignee: Rhone-Poulenc Chimie, Courbevoie Cedex, France

[21] Appl. No.: 265,786

[22] Filed: Jun. 27, 1994

[30] Foreign Application Priority Data

Jun. 25, 1993 [FR] France .................. 93 07742

[51] Int. Cl.⁶ .................................. C25B 11/00
[52] U.S. Cl. .................. 204/291; 204/282; 204/283; 204/290 R; 252/500; 252/518; 252/520; 252/521; 429/42
[58] Field of Search .................. 204/242, 252, 204/283, 282, 291, 290 R; 252/500, 520, 521, 518; 429/42; C25B 11/12, 11/10, 11/04

[56] References Cited

U.S. PATENT DOCUMENTS 4,743,349  5/1988  Bachot et al. .................. 204/242

*Primary Examiner*—Bruce F. Bell
*Attorney, Agent, or Firm*—Burns, Doane, Swecker & Mathis, L.L.P.

[57] ABSTRACT

Cathodes comprised of an asbestos-free microporous electroconductive substrate containing (a) carbon/graphite fibers, (b) polytetrafluoroethylene (PTFE) fibers and (c) inert mineral fibers, and (d) optionally, at least one thickening agent, consolidated together in a matrix of (e) at least one fluoropolymer binder, are well suited for the electrolysis of solutions of, e.g., alkali metal halides.

26 Claims, No Drawings

ASBESTOS-FREE CATHODES FOR ELECTROLYTIC CELLS

BACKGROUND OF THE INVENTION

1. Field of the Invention

The present invention relates to improved microporous electroconducting materials and cathodes/electrolytic cells comprised thereof, in particular cathodes/electrolytic cells for the electrolysis of alkali metal halide solutions.

This invention also relates to a process for the preparation of such novel electroconductive substrates.

The present invention further relates to composite of such cathodes that include a diaphragm and the electrolysis of alkali metal halide solutions utilizing same.

2. Description of the Prior Art

Chlorine and sodium hydroxide (caustic soda) are conventionally produced via electrolysis of aqueous solutions of sodium chloride (chlor-alkali units).

Materials suitable for use as cathodes in such NaCl electrolytic cells must possess certain properties, i.e., low electrical resistivity compatible with conducting the electrolysis at an acceptable energy level, small thickness (about 0.1 to 10 mm), and a large surface area which can be up to several square meters.

In addition, it must be possible to produce these materials by deposition onto a rigid structure having a great number of large diameter openings.

Such electroconductive materials are typically produced by vacuum filtration of a suspension of fibers and binders therefor, The properties of the material depend on a number of parameters, in particular the nature and concentration of the fibrous matter in suspension, surfactants, porogens and other additives.

A fibrous material is known to this art which combines such properties and which comprises a mixture of conducting and nonconducting fibers, as described in EP-A-0,319,517. This material comprises a mixture of asbestos and carbon fibers, with the carbon fibers imparting the electroconductivity, and the asbestos fibers fixing the binders during filtration.

Also, a number of improvements have been made to this material and to the preparative technique for the manufacture thereof.

Thus, EP-A-0,214,066 describes materials comprising carbon fibers having a monodisperse distribution of lengths and exhibiting considerably improved properties and quality, namely, a far better performance/thickness ratio.

EP-A-0,296,076 describes an electroactive material comprising an electrocatalytic agent which is uniformly distributed throughout its mass, said agent being selected from among Raney metals and Raney alloys and from which a major portion of the readily removable metal(s) has indeed been eliminated.

All of the cathode elements described ensure considerable current distribution and are suited for use in electrolytic cells that also comprise a membrane or diaphragm separating the anode and cathode compartments.

Nonetheless, the quality of the aforedescribed cathode elements, as well as others known to this art, is not completely satisfactory because of the requirement for asbestos fibers. In addition to the risks to human health attributed to the handling of this dangerous substance, a number of problems are associated with the inherent chemical instability of asbestos, such as too short a useful life of electrolytic cells containing such cathodes and difficulties in modifying the operating conditions of electrolysis, for example when increasing the electric power and/or the concentration of alkali metal hydroxide.

EP-A-0,222,671, assigned to the assignee hereof, describes, in one example, production of an asbestos-free precathode from a suspension which contains only conducting carbon fibers. The composition of the suspension, however, does not permit an industrial coating to be produced having a porosity which is both fine and regular and which firmly adheres to the cathode.

SUMMARY OF THE INVENTION

Accordingly, a major object of the present invention is the provision of novel asbestos-free electroconductive substrates and cathodes shaped therefrom that are well suited for the electrolysis of alkali metal halides and which avoid or conspicuously ameliorate the above disadvantages and drawbacks to date characterizing the state of this art.

Briefly, the present invention features novel microporous electroconducting substrates comprising a fibrous asbestos-free coating, said coating containing carbon or graphite conducting fibers, polytetrafluoroethylene fibers, inert mineral fibers, at least one fluorinated polymer binder for the fibers and, if necessary, at least one thickening agent.

This invention also features cathodic elements comprising such novel materials/substrates.

Also featured hereby is a process for the preparation of said novel microporous electroconducting material comprising:

(a) preparing an aqueous suspension having the following approximate composition:
  (i) 100 parts dry weight of a mixture of fibers which comprises 20 to 80 parts dry weight of carbon or graphite fibers and 80 to 20 parts dry weight of polytetrafluoroethylene fibers;
  (ii) 10 to 100 parts dry weight of inert mineral fibers;
  (iii) 10 to 60 parts dry weight of a fluorinated polymer binder for said fibers;
  (iv) 30 to 200, preferably 30 to 100 parts dry weight of silica based derivatives; and
  (v) 0 to 30 parts dry weight of at least one thickening agent;
(b) depositing a coating onto a porous support by programmed vacuum filtration of said suspension therethrough;
(c) draining the liquid medium therefrom and drying the coating thus obtained;
(d) sintering the coating; and
(e) removing the silica based derivatives therefrom.

DETAILED DESCRIPTION OF BEST MODE AND PREFERRED EMBODIMENTS OF THE INVENTION

More particularly according to the present invention, by "microporous electroconducting material", it is intended a microporous material or substrate having an electrical resistivity ranging from 0.5 to 15 $\Omega.cm$. For reasons of energy consumption, this resistivity preferably ranges from 0.5 to 10 $\Omega.cm$, and more preferably from 0.5 to 2 $\Omega.cm$.

In a preferred embodiment of the invention, the mixture of carbon or graphite fibers and polytetrafluoroethylene fibers comprises 60 to 80 parts by dry weight of the carbon or graphite fibers and 40 to 20 parts by dry weight of the polytetrafluoroethylene fibers.

Advantageously, the amounts of inert mineral (or inorganic) fibers and, if necessary, of thickening agent, employed during the subject process and present in the fibrous coating in accordance with the present invention, respectively range from 20 to 60 parts by dry weight and from 0 to 10 parts by dry weight.

In actual practice, the aqueous suspension prepared in step (a) of the process of this invention is advantageously a suspension containing about 2% to 5% of dry solids.

The electroconductive materials/substrates according to the invention, cathodes comprised thereof, whether simple or composite, and the use of same in electrolytic processing, will now be more fully described.

The polytetrafluoroethylene fibers, hereinafter designated PTFE fibers, according to the present invention may have variable dimensions. The diameter (D) generally ranges from 10 to 500 µm and the length (L) is such that the ratio L/D ranges from 5 to 500. Preferably, the PTFE fibers have average dimensions ranging from 1 to 10 mm in length and from 50 to 200 µm in diameter. Their preparation is described in U.S. Pat. No. 4,444,640. This type of PTFE fiber is well known to this art.

The carbon or graphite fibers are in the form of filaments having a diameter generally less than 1 mm, preferably ranging from $10^{-5}$ to 0.1 mm, and a length greater than 0.5 mm, preferably ranging from 1 to 20 mm.

These carbon or graphite fibers preferably have a monodispersed length distribution, i.e., a distribution of lengths such that the length of at least 80%, and advantageously at least 90%, of the fibers correspond to the average length ±20%, preferably ±10%.

By the term "inert mineral (or inorganic) fibers", it is intended to be any mineral fiber which is chemically inert in respect of the products formed during electrolysis in an electrolytic cell comprising same. The fibers are used to consolidate or reinforce the diaphragm, without adversely affecting the wettablity and conductivity of the composite. The mineral fibers must, therefore, be inert in respect to the caustic soda formed when the electrolyte comprises sodium chloride.

Preferred fibers are titanate fibers, calcium sulfoaluminate (ettringit) fibers, ceramic fibers (such as zirconium dioxide, silicon carbide and boron nitride fibers), titanium oxide fibers having the general formula $Ti_nO_{2n-1}$ where n is a whole number ranging from 4 to 10 (for example Ebonex™ marketed by ICI), whether used alone or in admixture. More preferably, titanate fibers are employed.

The titanate fibers are known materials; potassium titanate fibers are commercially available. Other such fibers are described in FR-A-2,555,207 and are derived from potassium octatitanate $K_2Ti_8O_{17}$ by partial replacement of the titanium ions in the oxidation state of IV by magnesium and nickel cations, or in the oxidation state of III such as iron or chromium cations, with charge compensation remaining assured by alkali metal ions such as sodium and potassium cations.

Other titanate fibers such as potassium tetratitanate ($K_2Ti_4O_9$) or derivatives thereof may also be used.

Compounds based on cellulose fibers which have been positively ionically charged may also be used. Such compounds are marketed by Beco under the trademark Becofloc®. These are used in amounts of from 0 to 100 parts dry weight.

By the term "thickening agent", it is intended to be a compound which increases the viscosity of the solution and exhibits water-retaining properties. The natural or synthetic polysaccharides are exemplary thereof. Biopolymers obtained by fermentation of a hydrocarbon in the presence of microorganisms are particularly preferred. Xanthan gum is especially representative. The xanthan gum is synthesized using bacteria of the genus Xanthomonas, more particularly the species described in Bergey's *Manual of Determinative Bacteriology* (8th edition, 1974, Williams N. Wilkins Co., Baltimore) such as *Xanthomonas begoniae, Xanthomonas campestris, Xanthomonas carotae, Xanthomonas hederae, Xanthomonas incanae, Xanthomonas malvacearum, Xanthomonas papavericola, Xanthomonas phaseoli, Xanthomonas pisi, Xanthomonas vasculorum, Xanthomonas vesicatoria, Xanthomonas Vitians, Xanthomonas pelargonii. Xanthomonas campestris* is particularly suitable for the synthesis of xanthan gum.

Other microorganisms which produce polysaccharides having similar properties are bacteria of the genus Arthrobacter, Erwinia, Azobacter, Agrobacter or fungi of the genus Sclerotium.

The xanthan gum may be produced via any known technique. The polysaccharide is conventionally isolated from the fermentation must by evaporation, drying and milling, or by precipitation by means of a lower alcohol, separation from the liquid, drying and milling, to obtain a powder. Commercially available powders normally have a granulometry ranging from 50 to 250 µm and a bulk density greater than about 0.7.

Fluorinated polymers are used as the consolidating binder for the electroconducting materials in accordance with the invention.

By the term "fluorinated polymers", it is intended to be homopolymers or copolymers derived at least in part from olefinic monomers substituted by fluorine atoms, or substituted by a combination of fluorine atoms and at least one chlorine, bromine or iodine atom per monomer.

Exemplary fluorinated homopolymers and copolymers are polymers and copolymers prepared from tetrafluoroethylene, hexafluoropropylene, chlorotrifluoroethylene and bromotrifluoroethylene.

These polymers may also comprise up to 75 mole % of other derivatives of ethylenically unsaturated comonomers containing at least as many fluorine atoms as carbon atoms, for example vinylidene (di)fluoride and vinyl or perfluoroalkyl esters such as perfluoroalkoxyethylene.

The fluorinated polymer is advantageously employed in the form of an aqueous dispersion typically containing 30% to 70% of dry polymer having a granulometry of from 0.1 to 5 micrometers, preferably from 0.1 to 1 micrometer.

Polytetrafluoroethylene is the preferred fluorinated polymer.

By the term "silica based derivatives", it is intended to be precipitated silica and combustion or pyrogenic silica.

The silica advantageously has a BET specific surface area ranging from 100 $m^2/g$ to 300 $m^2/g$ and/or a granulometry, measured using a Coulter® meter, of from 1 to 50 µm, preferably from 1 to 15 µm.

These derivatives are excellent porogens which exert essentially no deconsolidation influence on the microporous electroconducting material when used in the amounts employed in the present invention. These derivatives also serve as network-forming agents for the latex constituting the binder.

Elimination or removal of the silica based derivatives may be carried out by alkaline attack. This extraction creates the microporosity in the material of the present invention. The silica based derivatives may be eliminated before the microporous electroconducting material is used, but it is more practical and advantageous to remove the silica based derivatives "in situ" in the electrolytic cell by dissolving it with alkaline medium, particularly during the first few hours of electrolysis. Extraction is thus advantageously carried out via contacting with an aqueous sodium hydroxide solution at a concentration of between 40 and 200 g/l and a temperature of from 20° to 95° C.

During preparation of the suspension in step (a) of the present invention, it is preferable to add at least one surfactant. The maximum amount of surfactant present is typically 10 parts dry weight, and preferably the amount of surfactant ranges from 0.5 to 5 parts dry weight. A nonionic surfactant is preferably used, in particular ethoxylated alcohols or fluorocarbon compounds containing functional groups, whether used alone or in admixture. The alcohols or fluorocarbon compounds typically have $C_6$ to $C_{20}$ carbon atom chains. Ethoxylated alcohols which are ethoxylated alkylphenols, in particular octoxynols, are the preferred.

Other elements may be added to the suspension to step (a) of the process of the invention. These additives may, in particular, be electrocatalytic agents selected from among Raney metals and alloys and mixtures thereof, from which the major fraction of the readily removable metal(s) are eliminated. Electroactive materials comprising an electrocatalytic agent of this type are described in EP-A-0,296,076, assigned to the assignee hereof.

In accordance with the process of the present invention, the coating is formed/deposited by programmed vacuum filtration of said suspension through a porous support. These porous supports may, in particular, comprise a gauze or screen having a mesh size, perforations, or porosity, ranging from between 20 µm and 5 mm. These porous supports may have one or more planar or cylindrical face surfaces, known to this art as a "glove finger" presenting an open surface.

When the microporous electroconducting composite in accordance with the invention is used for the electrolysis of alkaline halides, specifically sodium chloride, the microporous electroconducting substrate may be associated with a metallic support constituting an elementary cathode. This is typically designated the "cathode element" or the bulk electrode. These terms encompass a rigid metallic support whose function, solely, is to convey electric current, and a microporous electroconducting material which serves as the cathode.

The microporous electroconducting material/metallic support composite may be produced by a variety of methods. The first technique is to first produce the coating as described in steps (a) to (c) of the preparative process for the microporous electroconducting material according to the present invention, then to apply the coating to the metallic support which constitutes the elementary cathode, followed by sintering of the composite. In a preferred embodiment of the invention, the suspension described in step (a) of the process for the preparation of the microporous electroconducting substrate is filtered directly through the metallic support constituting the elementary cathode.

The process of the invention is thus particularly preferred for the production of a cathode element. The cathode element thus comprises a rigid electroconducting structure, such as a porous metallic support, onto which the microporous electroconducting material of the invention is deposited.

When the subject cathode is employed in alkali metal halide electrolytic cells, or more specifically sodium chloride cells, the cathode element may be associated or combined with a diaphragm or membrane which serves as a separator between the cathode and anode in the electrolytic cell.

The membrane may be selected from the numerous electrolysis membranes described in the literature, patent and otherwise. The cathode of the invention constitutes an excellent mechanical support and ensures good current distribution. This current distribution is a result of the unique structure of such cathode.

The cathode element may also be in combination with a diaphragm.

The diaphragm is comprised of fibers which are microconsolidated into a sheet. Such diaphragm, which may also be selected from among numerous known electrolysis diaphragms, may also be manufactured separately. It may also be formed directly onto the coating of fibers defining the microporous electroconducting material.

Those diaphragms described in EP-A-0,412,916 and EP-A-0,412,917, assigned to the assignee hereof, are the preferred. Advantageously, the asbestos-free diaphragm described in EP-A-0,412,917 is employed.

It will be appreciated that the subject composite is in certain respects a stacked array of three layers, i.e., of the porous metallic support, the microporous electoconducting material and the membrane or diaphragm, such stacked array comprising an integral composite.

The various vacuum programs or profiles described above may be carried out continuously or incrementally, from atmospheric pressure to the final pressure of about 0.01 to 0.5 bars absolute.

The sintering is typically carried out at a temperature above the melting point or softening of the fluorinated polymers which serve as binding agents for the fibers. Sintering consolidates the coating described above.

In order to further illustrate the present invention and the advantages thereof, the following specific examples are given, it being understood that same are intended only as illustrative and in nowise limitative.

In said examples to follow, as in the above description, all parts and percentages are given by weight, unless otherwise indicated.

EXAMPLE 1 (Comparative)

Production of a microporous electroconducting substrate containing asbestos fibers:

A suspension was prepared from the following:

(i) deionized water, the amount being calculated to provide about 4 liters of suspension having a dry solids content of about 4.8% by weight, (ii) 30 g of chrysotile asbestos fibers having an average length of 1 to 5 mm and diameter of about 200 Angström, (iii) 2.1 g of xanthan gum.

After stirring for several minutes, the following materials were added:

(iv) 35 g of polytetrafluoroethylene latex having a 60% dry solids content, (v) 100 g of precipitated silica in the form of particles having an average granulometry of 3 mm and a BET specific surface area of 250 $m^2g^{-1}$, (vi) 70 g of carbon fibers having a diameter of about 1.5 mm and an average length of 10 mm, (vii) 3.3 g of Triton X 100® marketed by Rohm & Haas,
(viii) 121 g of Raney nickel in the form of a 10 mm powder (Ni 20 marketed by Procatalyse).

After stirring, the suspension was deposited, by predetermined programmed vacuum filtration, onto a woven iron screen laminated with "Ghent" steel having a 2 mm mesh and a wire diameter of 1 mm, the effective surface area being 1.21 dm$^2$.

Suction was then commenced, and the pressure was decreased at 50 mbars per minute until it reached a value of about 800 mbars. This maximum partial vacuum was maintained for about 15 minutes.

The composite assembly was then dried and consolidated by fusing the fluorinated polymer.

The silica was eliminated "in situ" in the electrolytic cell by dissolving it in an alkaline medium, particularly during the first hours of electrolysis.

The deposited suspension had the following characteristics:
(a) the drainage time was 200–300 s;
(b) the deposit ratio was about 70%;
(c) the final vacuum was 200 to 300 mbar;
(d) the thickness was 1.5 to 2.5 mm;
(e) the electrical resistivity was 0.5 to 2 Ω cm.

The drainage time corresponded to the period of time required to filter all of the suspension (since the vacuum had been programmed; the drainage time was a characterizing parameter of the deposition which depended on the filtered suspension).

The maximum partial vacuum attained by the system was maintained for about 15 minutes, corresponding to a drying phase for the coating formed. At the end of this drying phase, the partial vacuum was at a stationary value, designated the final vacuum. The final vacuum was also a characterizing parameter of the deposition and dependent on the filtered suspension. More particularly, it is a characteristic of the porous structure of the deposited coating.

The deposit ratio was determined simply by weighing the materials.

After drying or consolidation, the coating formed could be detached from the screen on which it had been deposited. The electrical resistivity was measured by means of an ohmmeter connected to two conducting metallic plates applied on the opposite face surfaces of the coating.

Production of a composite of a cathode element containing asbestos and an asbestos-free diaphragm:

A coating was deposited onto a cathode (microporous material+screen) to provide a diaphragm, under the conditions described in the examples of EP-A-0,412,917, assigned to the assignee hereof.

The initial suspension for the preparation of the diaphragm was as follows:
(i) 100 g of polytetrafluoroethylene fibers (PTFE), introduced as 200 g of a mixture of sodium chloride and PTFE fibers (50/50 by weight) which had been pretreated as described below,
(ii) 60 g of potassium titanate fibers having a diameter of 0.2 to 0.5 mm and length of 10 to 20 mm,
(iii) 40 g of polytetrafluoroethylene latex, containing about 65% by weight of dry solids,
(iv) 50 g of precipitated silica in the form of particles having an average granulometry of 3 mm and a BET specific surface area of 250 m2/g,
(v) 3.6 g of Triton X 100® marketed by Rohm & Haas.

The NaCl impregnated PTFE fibers were pretreated by mixing a solution of 1 liter of water comprising about 100 g of a mixture containing about 50% of PTFE fibers and 50% of sodium chloride. This operation was repeated, if necessary, to provide the desired amount of PTFE fibers.

The performance of the composite thus produced was evaluated in an electrolytic cell having the following characteristics and operating conditions:
(1) Expanded laminated titanium anode coated with $TiO_2$-$RuO_2$;
(2) Woven and laminated mild steel cathode; 2 mm wires, 2 mm mesh coated with a microporous electroconducting material and a diaphragm;
(3) Anode-composite distance of 6 mm;
(4) Effective surface area of electrolyzer of 0.5 dm$^2$;
(5) Filter press cell assembly;
(6) Current density of 25 A dm$^{-2}$;
(7) Temperature of 85° C.;
(8) Operating with anodic chloride constant at 4.8 mole l$^{-1}$;
(9) Electrolytic caustic soda concentration of 120 or 200 g/l.

The particular conditions employed and the results obtained are reported in Table (III) below:
(a) RF: Faraday yield;
(b) ΔU: tension at electrolytic cell terminals at specified current density;
(c) Performance (kwh/TCl$_2$) is the energy consumption of the system in kilowatt hours per tonne of chlorine produced;
(d) $\Delta U_{I \rightarrow O}$ is the electrolyzing tension at 85° C. and I=O by extrapolation of U=f(x) curve.

EXAMPLE 2 (Comparative)

Production of carbon fiber-based microporous electroconducting substrate:

A microporous electroconducting substrate was prepared in the same manner as that described in comparative Example 1, from a suspension comprising the following:
(i) 7,000 g of deionized water,
(ii) 100 g of graphite fibers having a length of 1 to 2 mm,
(iii) 1 g of Na dioctylsulfosuccinate,
(iv) 100 g of polytetrafluoroethylene latex having about 65% by weight of dry solids,
(v) 100 g of precipitated silica in the form of particles having an average granulometry of 3 mm and a BET specific surface area of 250 m$^2$ g$^{-1}$,
(vi) 235 g of Raney alloy.

The deposition characteristics were as follows:
(a) the drainage time was less than 100 s,
(b) the deposit ratio was about 80%,
(c) the final vacuum was less than 200 mbar.

The drainage time and final vacuum values were low. This was interpreted as being due to the formation of a microporous electroconducting substrate which was too thick and highly nonuniform over the entire surface.

EXAMPLES 3–8 (Comparative)

Production of an inert mineral fiber-free and an asbestos fiber-free microporous electroconducting substrate:

A microporous electroconducting substrate was prepared in the same manner as that of comparative Example 1, from a suspension comprising:
(i) 30 g of PTFE fibers introduced in the form of a mixture of sodium chloride and PTFE fibers (50/50 by weight) which had been pretreated as described above,
(ii) 70 g of carbon fibers having a diameter of about 1.5 mm and average length of 10 mm,
(iii) 15 or 35 g of polytetrafluoroethylene latex having about 65% by weight of dry solids,
(iv) 50 or 100 g of precipitated silica in the form of particles having an average granulometry of 3 mm and a BET specific surface area of 250 m$^2$ g$^{-1}$, (v) Raney nickel,
(vi) 9 to 16 g of xanthan gum (Rhodopol® 23 marketed by Rhône-Poulenc) corresponding, respectively, to 0.06 or 0.10 weight % in water,
(vii) 0 or 3.6 g of Triton X 100® marketed by Rohm & Haas.

Deposition characteristics of the suspension are reported in Table (I):

(viii) 2 g of Triton X 100® marketed by Rohm & Haas.

Deposition characteristics of the suspension are reported in the following Table (II):

TABLE I

| | Composition of suspension | | | | | Deposition conditions | | | Characteristics | |
|---|---|---|---|---|---|---|---|---|---|---|
| | xanthan | PTFE latex | silica | Triton | Raney Ni | wt | deposit ratio | T | V | E | Q |
| Ex. | g | g | g | g | g | g | % | s | m-bar | mm | Ω cm |
| 3 | 9 | 15 | 50 | 0 | 5.7 | 300 | 62 | 215 | 60 | 2.5 | 1 |
| 4 | 9 | 55 | 50 | 0 | 5.7 | 302 | 81 | 160 | 83 | 3 | 0.5–1 |
| 5 | 9 | 55 | 100 | 3.3 | 5.7 | 301 | 40 | 150 | 58 | 2 | 0.5–1 |
| 6 | 16 | 35 | 50 | 0 | 0 | 300 | 72 | 175 | 70 | 2 | 0.5–1 |
| 7 | 16 | 35 | 100 | 0 | 0 | 301 | 46 | 175 | 75 | 2 | 0.5–1 |
| 8 | 16 | 35 | 100 | 3.3 | 0 | 301 | 42 | 175 | 85 | 1 | 0.5–1 |

In this and the following Tables, T represents the drainage time, V represents the final vacuum (see comparative Example 1), wt represents the weight deposited on the screen, E represents the deposit thickness and Q represents the resistivity.

TABLE II

| | Composition of suspension | | | | | Deposition conditions | | | Characteristics | |
|---|---|---|---|---|---|---|---|---|---|---|
| | titanate fiber | PTFE latex | silica | Triton | Raney Ni | wt | deposit ratio | T | V | E | Q |
| Ex. | g | g | g | g | g | g | % | s | m-bar | mm | Ω cm |
| 9 | 5 | 15 | 50 | 2 | 6.3 | 300 | 55 | 220 | 100 | 2.5 | 7 |
| 10 | 10 | 15 | 50 | 2 | 6.3 | 302 | 52 | 215 | 80 | 2.5 | 9 |
| 11 | 10 | 15 | 50 | 2 | 6.3 | 300 | 60 | 195 | 100 | 2.5 | 13 |
| 12 | 50 | 35 | 100 | 2 | 3 | 330 | 51 | 220 | 200 | 1.4 | 0.5–2 |
| 13 | 100 | 35 | 100 | 2 | 2.6 | 330 | 37 | 220 | 200 | 1.4 | 6 |

EXAMPLES 9–13

Production of a microporous electroconducting substrate in accordance with the invention:

A microporous electroconducting substrate was prepared as in comparative Example 1 from a suspension comprising the following:

(i) 5, 10, 50 or 100 g of potassium titanate fibers having a diameter of 0.02 to 1.5 mm and length of 10 to 20 mm,
(ii) 30 g of PTFE fibers introduced in the form of a mixture of sodium chloride and PTFE fibers (50/50 by weight) which had been pretreated as described above,
(iii) 70 g of carbon fibers having a diameter of about 1.5 mm an average length of 10 mm,
(iv) 15 or 35 g of polytetrafluoroethylene latex having about 65% by weight of dry solids,
(v) 50 or 100 g of precipitated silica in the form of particles having an average granulometry of 3 mm and a BET specific surface area of 250 m$^2$ g$^{-1}$,
(vi) Raney nickel containing about 70% of dry solids,
(vii) 9 g of xanthan gum (Rhodopol® 23 marketed by Rhône-Poulenc) corresponding to 0.06 weight % in water, These examples evidenced that addition of inert inorganic fibers such as titanate fibers into the microporous materials is necessary for the production of an industrially viable deposit. The drainage times and final vacuums obtained reached those measured during manufacture of substrates containing asbestos fibers described in comparative Example 1 (aside from Examples 3 to 8 where the drainage time remained insufficient and the final vacuum too low).

EXAMPLE 14 (Comparative)

Production of a xanthan-free microporous electroconducting substrate:

A microporous electroconducting substrate was prepared as in comparative Example 1 from a suspension comprising the following:
(i) 50 g of potassium titanate fibers having a diameter of 0.02 to 1.5 mm and a length of 10 to 20 mm,
(ii) 30 g of PTFE fibers introduced in the form of a mixture of sodium chloride and PTFE fibers (50/50 by weight) which had been pretreated as described above, (iii) 70 g of carbon fibers having a diameter of about 1.5 mm an average length of 10 mm,
(iv) 35 g of polytetrafluoroethylene latex having about 65% by weight of dry solids,
(v) 100 g of precipitated silica in the form of particles having an average granulometry of 3 mm and a BET specific surface area of 250 m$^2$ g$^{-1}$,
(vi) 3 g of Raney nickel containing about 70% of dry solids.

It will be seen that the combination in accordance with the invention performed satisfactorily and had low hydrogen levels in the chlorine. These performances were comparable to a combination of a cathode element and a diaphragm containing asbestos (comparative Example 1).

TABLE III

| Ex. | Microporous material wt kg/m$^2$ | Diaphragm wt kg/m$^2$ | Electrolysis performances ||||||
|---|---|---|---|---|---|---|---|---|
| | | | NaOH g/l | RF % | ΔU Volt | ΔU$_{I\to 0}$ Volt | kwh/ TCl$_2$ | H$_2$ (%) in chlorine |
| 15 | 0.28 | 1.95 | 120 | 98.5 | 3.05 | 2.19–2.20 | 2340 | <0.2 |
|   |      |      | 140 | 96   | 3.05 | 2.19–2.20 | 2400 | <0.2 |
|   |      |      | 160 | 92   | 3.05 | 2.19–2.20 | 2500 | <0.2 |
|   |      |      | 180 | 88   | 3.05 | 2.19–2.20 | 2620 | <0.2 |
|   |      |      | 200 | 86   | 3.05 | 2.19–2.20 | 2680 | <0.2 |
| 16 | 0.34 | 1.97 | 120 | 98   | 3.2  | 2.20–2.22 | 2465 | <0.2 |
|   |      |      | 140 | 95   | 3.2  | 2.20–2.22 | 2540 | <0.2 |
|   |      |      | 160 | 92   | 3.2  | 2.20–2.22 | 2625 | <0.2 |
|   |      |      | 180 | 88   | 3.2  | 2.20–2.22 | 2745 | <0.2 |
|   |      |      | 200 | 86   | 3.2  | 2.20–2.22 | 2810 | <0.2 |
| 1  | 0.35 | 2    | 120 | 98.5 | 3.05 | 2.19–2.20 | 2340 | <0.2 |
|   |      |      | 140 | 96   | 3.05 | 2.19–2.20 | 2400 | <0.2 |
|   |      |      | 160 | 92   | 3.05 | 2.19–2.20 | 2500 | <0.2 |
|   |      |      | 180 | 88   | 3.05 | 2.19–2.20 | 2620 | <0.2 |
|   |      |      | 200 | 86   | 3.05 | 2.19–2.20 | 2680 | <0.2 |

Deposition characteristics of the suspension were as follows:
(a) the filtered suspension weighed 330 g,
(b) the drainage time was 120 s;
(c) the deposit ratio was about 50%;
(d) the final vacuum was 163 mbar;
(e) the thickness was 1.3 to 1.5 mm;
(f) the electrical resistivity was 10 Ω cm.

EXAMPLES 15 and 16

Production of a microporous electroconducting substrate in accordance with the invention:

The procedure of Example 12 was repeated, except for the amount of Raney nickel used. An amount of 5 g (Example 15) or 2.5 g (Example 16) of Raney nickel were introduced into the suspension. The microporous electroconducting substrate, together with the screen, constituted an asbestos-free cathode in accordance with the invention.

Production of a composite of asbestos-free cathode and asbestos-free diaphragm therefor:

The operating procedure of comparative Example 1 was repeated to produce this composite.

Performances and combinations are reported in the following Table (III).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An asbestos-free microporous electroconductive substrate, comprising intimate admixture of (a) carbon or graphite fibers, (b) polytetrafluoroethylene fibers and (c) 10 to 100 parts by weight of inert mineral fibers, and (d) optionally, at least one thickening agent, consolidated by (e) 10 to 60 parts by weight of at least one fluorinated polymer.

2. The microporous electroconductive substrate as defined by claim 1, comprising 20 to 80 parts by weight of said carbon or graphite fibers, and 20 to 80 parts by weight of said polytetrafluoroethylene fibers.

3. The microporous electroconductive substrate as defined by claim 2, comprising 60 to 80 parts by weight of said carbon or graphite fibers and 40 to 20 parts by weight of said polytetrafluoroethylene fibers.

4. The microporous electroconductive substrate as defined by claim 3, comprising 20 to 60 parts by weight of said inert mineral fibers.

5. The microporous electroconductive substrate as defined by claim 1, comprising up to 30 parts by weight of said at least one thickening agent.

6. The microporous electroconductive substrate as defined by claim 5, comprising up to 10 parts by weight of said at least one thickening agent.

7. The microporous electroconductive substrate as defined by claim 5, said at least one thickening agent comprising a natural or synthetic polysaccharide.

8. The microporous electroconductive substrate as defined by claim 7, said at least one thickening agent comprising a xanthan gum.

9. The microporous electroconductive substrate as defined by claim 1, said polytetrafluoroethylene fibers having a diameter (D) of from 10 to 500 μm and a length (L) such that the ratio L/D ranges from 5 to 500.

10. The microporous electroconductive substrate as defined by claim 9, said polytetrafluoroethylene fibers having an average diameter ranging from 50 to 200 μm and an average length ranging from 1 to 10 mm.

11. The microporous electroconductive substrate as defined by claim 1, said carbon or graphite fibers having a diameter of less than 1 mm and a length of greater than 0.5 mm.

12. The microporous electroconductive substrate as defined by claim 11, said carbon or graphite fibers having a diameter of from $10^{-5}$ to 0.1 mm and a length of from 1 to 20 mm.

13. The microporous electroconductive substrate as defined by claim 12, said carbon or graphite fibers having a monodisperse distribution of lengths.

14. The microporous electroconductive substrate as defined by claim 1, said inert mineral fibers comprising titanate fibers, calcium sulfoaluminate fibers, ceramic fibers, or titanium oxide fibers having the general formula $Ti_nO_{2n-1}$ where n is a whole number ranging from 4 to 10.

15. The microporous electroconductive substrate as defined by claim 14, said inert mineral fibers comprising titanate fibers.

16. The microporous electroconductive substrate as defined by claim 1, comprising up to 100 parts by weight of positively ionically charged cellulosic fibers.

17. The microporous electroconductive substrate as defined by claim 1, said at least one fluoropolymer binder comprising a polymer or copolymer of tetrafluoroethylene, hexafluoropropylene, chlorotrifluoroethylene bromotrifluoroethylene or mixture thereof.

18. The microporous electroconductive substrate as defined by claim 17, said at least one fluoropolymer binder comprising up to 75 mole % of an ethylenically unsaturated comonomer containing at least as many fluorine atoms as carbon atoms.

19. The microporous electroconductive substrate as defined by claim 17, said at least one fluoropolymer binder comprising polytetrafluoroethylene.

20. A shaped article comprising the microporous electroconductive substrate as defined by claim 1.

21. A cathode comprising a rigid, electroconducting porous metallic support having a layer of the microporous electroconductive substrate as defined by claim 1 deposited thereon.

22. The cathode as defined by claim 21, having an electrolytic diaphragm overcoated thereon.

23. The cathode as defined by claim 22, said electrolytic diaphragm comprising an asbestos-free diaphragm.

24. In an electrolytic cell comprising an anode compartment and a cathode compartment, the improvement which comprises, as the cathode element therefor, the cathode as defined by claim 21.

25. The electrolytic cell as defined by claim 24, comprising a membranous separator between said anode and said cathode compartments.

26. An asbestos-free microporous electroconductive substrate, comprising intimate admixture of 100 parts by weight of a combination of carbon or graphite fibers and polytetrafluoroethylene fibers, 10 to 100 parts by weight of inert mineral fibers and 10 to 60 parts by weight of at least one fluorinated polymer that binds said carbon or graphite fibers, polytetrafluoroethylene fibers and inert mineral fibers.

* * * * *